United States Patent [19]

Tatsuhama et al.

[11] 4,392,744
[45] Jul. 12, 1983

[54] METHOD OF AND APPARATUS FOR DETERMINING ANGULAR AND TRANSVERSAL DISPLACEMENTS OF SHIELD MACHINE AND SUCCEEDING PIPE

[75] Inventors: Tetsuro Tatsuhama, Takarazuka; Masao Okabe, Sendai, both of Japan

[73] Assignee: Okumura Corporation, Osaka, Japan

[21] Appl. No.: 248,337

[22] Filed: Mar. 27, 1981

[30] Foreign Application Priority Data

Oct. 9, 1979 [JP] Japan ................................ 54/130349

[51] Int. Cl.³ ...................... G01B 11/27; E21C 44/00
[52] U.S. Cl. ......................................... 356/153; 299/1
[58] Field of Search ............................. 356/152–153, 356/138; 299/1; 175/26; 405/143; 33/286

[56] References Cited

U.S. PATENT DOCUMENTS 3,321,244  5/1967  Williamson et al. ................. 33/286
3,484,136  12/1969  Colson .................................. 299/1
4,238,828  12/1980  Hay et al. ............................. 299/1

FOREIGN PATENT DOCUMENTS 43-17341  7/1968  Japan .
45-26433  10/1970  Japan .
388196  6/1973  U.S.S.R. ............................... 356/152

Primary Examiner—William H. Punter
Attorney, Agent, or Firm—Armstrong, Nikaido, Marmelstein & Kubovcik

[57] ABSTRACT

Method and apparatus for determining angular and transversal displacements of a shield machine and a succeeding pipe relative to a pre-determined schedule central axis of a tunnel to be constructed by pipe-jacking tunneling which includes providing on the shield machine a first light emitter which emits rearwardly a light beam along the central longitudinal axis of the shield machine and a reference position on the axis of the shield machine, projecting the light beam to a pair of targets, each having a scale and being provided in a succeeding pipe spaced from each other by a predetermined distance along the central longitudinal axis of the succeeding pipe to form light spots on the targets, projecting to the pair of targets a light beam emitted from a second light emitter along the scheduled central axis of the tunnel to be constructed to form further light spots on the targets with the second light emitter being located at the rear portion of the tunnel, and reading the light spots and the further light spots on each of the targets on the respective scales and measuring a distance from the reference position to one of the targets to determine the angular and transversal displacements of the shield machine and the succeeding pipe relative to the scheduled central axis of the tunnel to be constructed. Certain calculation formulas are presented. The targets can be pivotally mounted in the succeeding pipe to pivot away from or into the paths of the light beams. Each target can be a semi-transparent plate on which the scale is marked.

4 Claims, 7 Drawing Figures

METHOD OF AND APPARATUS FOR DETERMINING ANGULAR AND TRANSVERSAL DISPLACEMENTS OF SHIELD MACHINE AND SUCCEEDING PIPE

The present invention relates to a method of and an apparatus for determining angular and transversal displacements of a shield digging machine (hereinafter simply referred to as shield machine) and a succeeding pipe relative to a predetermined scheduled central axis of a tunnel to be constructed by pipe-jacking tunneling wherein the shield machine is propelled by being pushed by means of jacks placed at the rear portion of the tunnel through pipes succeeding to the shield machine.

In recent years, in the tunneling using a shield machine, it has become common to determine the displacement of the shield machine from the predetermined scheduled central axis of the tunnel by means of a laser beam. For instance, in one arrangement, a target is attached to the rear end portion of the shield machine and a laser beam is directed to the target from the starting shaft to visually determine the transversal displacement, i.e. horizontal and vertical displacements of the rear end portion of the shield machine relative to the predetermined scheduled central axis of the tunnel to be constructed. In another arrangement, the target comprises many expensive photodiodes arranged in matrix to determine the displacement. Generally, however, the former arrangement comprising one visually inspected target is commonly used. In either arrangement, only the transversal displacement of the rear end portion of the shield machine relative to the scheduled central axis of the tunnel to be constructed can be determined.

In order to control the propelling direction of the shield machine, in pipe-jacking tunneling, it is necessary to determine angular and transversal displacements of the shield machine and a succeeding pipe relative to the predetermined scheduled central axis of the tunnel to be constructed.

For instance when a shield machine 1 and succeeding pipes 4 are in the state shown in FIG. 1, more particularly when the shield machine 1 is inclined relative to the scheduled central axis 12 of the tunnel to be constructed while the succeeding pipes 4 are properly on the axis 12, the correction of the propelling direction of the shield machine 1 is not effected with the prior arrangement since the rear end portion of the shield machine 1 where the target is attached, is not detectably displaced while the forward end portion of the shield machine 1 is considerably displaced. Thus, with the prior arrangement, the correction of the propelling direction of the shield machine 1 is effected only when the rear end portion of the shield machine 1 is detectably transversely displaced from the axis 12 so that there is a danger that the tunnel thus constructed considerably deviates from the predetermined scheduled central axis 12 of the tunnel to be constructed.

Also in the situation shown in FIG. 2, there is a similar danger. In FIG. 2, the shield machine 1 is properly on the axis 12 while the succeeding pipes 4 are displaced angularly and/or transversely relative to the axis 12 following the locus of the shield machine 1. Also in this case, the correction of the propelling direction of the shield machine 1 is not effected with the prior arrangement since the shield machine 1 is in the proper position on the axis 12. Since the shield machine 1 is propelled or pushed forwardly by the immediately succeeding inclined pipe 4, however, the shield machine 1 is propelled out of the axis 12 by the thrust inclined relative to the axis 12.

In order to eliminate such drawbacks of the prior art, according to the present invention, the angular and transversal displacements of both of the shield machine and a succeeding pipe relative the predetermined scheduled central axis of the tunnel to be constructed are determined.

Thus, it is an object of the present invention to eliminate above described drawbacks of the prior art.

A more specific object of the present invention is to provide method of and apparatus for determining the angular and transversal displacements of a shield machine and a succeeding pipe relative to a predetermined scheduled central axis of a tunnel to be constructed by pipe-jacking tunneling.

According to the present invention, there is provided a method of determining angular and transversal displacements of a shield machine and a succeeding pipe relative to a predetermined scheduled central axis of a tunnel to be constructed by pipe-jacking tunneling comprising, providing on the shield machine a first light emitter which emits rearwardly a light beam along the central longitudinal axis of the shield machine, projecting said light beam to a pair of targets each having a scale and provided in a succeeding pipe and spaced from each other by a predetermined distance along the central longitudinal axis of said succeeding pipe to form light spots on the targets, projecting to said pair of targets another light beam emitted from a second light emitter along said scheduled central axis of the tunnel to be constructed to form light spots on the targets, said second light emitter being located at the rear portion of the tunnel, and reading said light spots on each target on the respective scales to determine the angular and transversal displacements of the shield machine and said succeeding pipe relative to said scheduled central axis of the tunnel to be constructed.

Further, according to the present invention, there is provided an apparatus for determining angular and transversal displacements of a shield machine and a succeeding pipe relative to a predetermined scheduled central axis of a tunnel to be constructed by pipe-jacking tunneling comprising, a first light emitter provided in the shield machine for emitting a light beam rearwardly along the central longitudinal axis of the shield machine, a pair of targets arranged in said succeeding pipe for receiving the light beam emitted from said first light emitter to form light spots on the targets and each target having a scale and spaced apart from each other by a predetermined distance along the central longitudinal axis of said succeeding pipe, a second light emitter located in the rear portion of the tunnel for emitting a light beam along said scheduled central axis of the tunnel to be constructed to form light spots on the targets, and said light spots on each target being read on the respective scales to determine angular and transversal displacements of the shield machine and said succeeding pipe relative to said predetermined scheduled central axis of the tunnel to be constructed.

According to the present invention in one embodiment thereof, each target is pivotably mounted in said succeeding pipe so that the targets are pivotable away from or into the path of said light beam.

Furthermore, according to the present invention in another embodiment, each target comprises a semitransparent plate on which the scale is marked.

These and other objects and features of the present invention will be better understood upon consideration of the following detailed description and the accompanying drawings in which.

Figure 1:
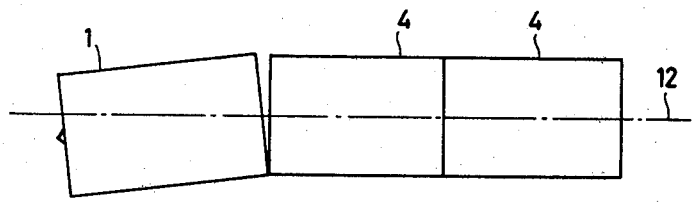
FIGS. 1 and 2 are schematical illustrations of possible orientations of a shield machine and succeeding pipes.
Figure 2:
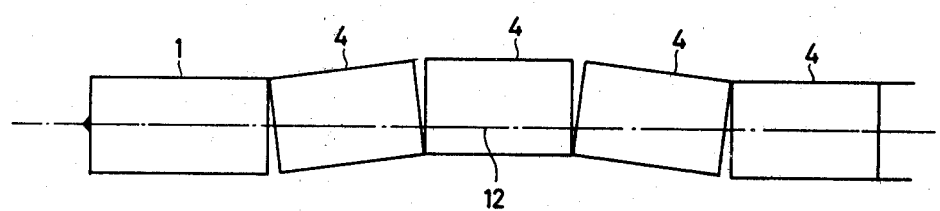
Figure 3:
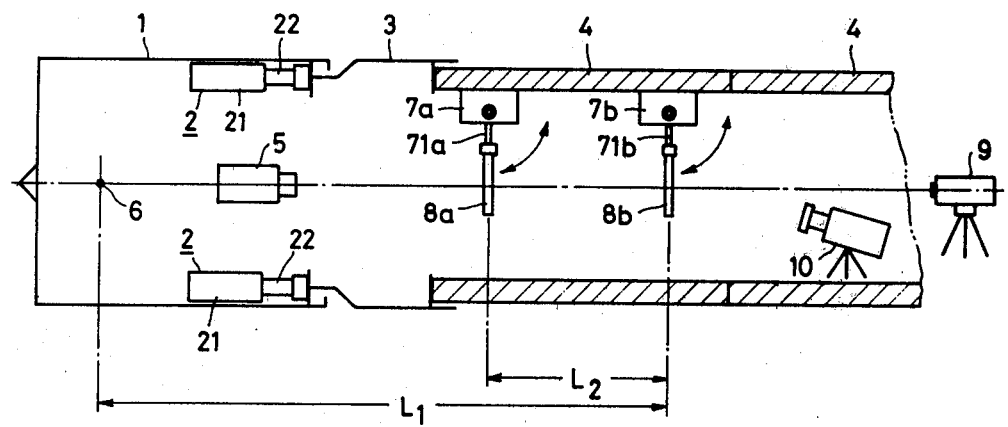
FIG. 3 is a schematical illustration of an embodiment of the present invention.

with reference now to the drawings and more particularly to FIG. 3 thereof, there is schematically illustrated an embodiment of the present invention. In FIG. 3, the reference numeral 1 designates a shield machine and 2 a plurality of jacks for correcting or changing the propelling direction of the shield machine 1. The cylinder 21 of each jack 2 is rigidly fixed to the interior of the shield machine 1 and the piston rod 22 is abutted against one end of a short tube 3 which is slidably fitted in the rear end portion of the shield machine 1. The other end of the short tube 3 is abutted against one end of an immediately succeeding pipe 4. The jacks 2 are circumferentially spaced apart from each other but in FIG. 3 only two of them are shown. The short tube 3 may be omitted as desired.

The reference numeral 5 designates a first light emitter such as a laser means which is arranged in the central portion of the shield machine 1 and emits a well concentrated light beam rearwardly along the central longitudinal axis of the shield machine 1. 6 is a reference point on the central longitudinal axis of the shield machine 1. 7a and 7b are support and drive means for targets 8a and 8b, respectively, and each has an arm 71a and 71b connected to the target 8a or 8b. Means 7a and 7b are removably mounted on the succeeding pipe 4 and support the targets 8a and 8b spaced apart from each other by a predetermined distance $L_2$ along the central longitudinal axis of the pipe 4. The targets 8a and 8b each has a scale marked thereon. 9 is a second light emitter such as a laser means stationarily located in the rear portion of the tunnel, for instance on the bottom of the starting shaft, for emitting a well concentrated light beam along a predetermined scheduled central axis of the tunnel to be constructed.

Each of the targets 8a and 8b preferably comprises a semitransparent plate so that the light spots formed on the plate by impinging of the light beams from the first and second light emitters 5 and 9, respectively, can be seen simultaneously from one side of the target. Each target further comprises a scale marked on said semitransparent plate.

The targets 8a and 8b are suspended from the respective support and drive means 7a and 7b in such way that the intersection point of the axis of abscissas and the axis of ordinates of each scale is located on the central longitudinal axis of the pipe 4. The targets 8a and 8b are pivotally supported by the support and drive means 7a and 7b, respectively, so that the targets are pivotally moved as shown by the arrows by said means 7a and 7b away from or into the paths of said light beams for the purpose described hereinafter. 10 is a T.V. camera for reading or monitoring the light spots formed on the targets 8a and 8b relative to the respective scales. The T.V. camera 10 may be mounted in any suitable succeeding pipe 4.

The scale may be mixed on one surface of the semitransparent plate by painting or by attaching thin strips of an opaque material.

The operation of the present invention will now be described referring to FIGS. 4, 5, 6A and 6B.

Figure 4:
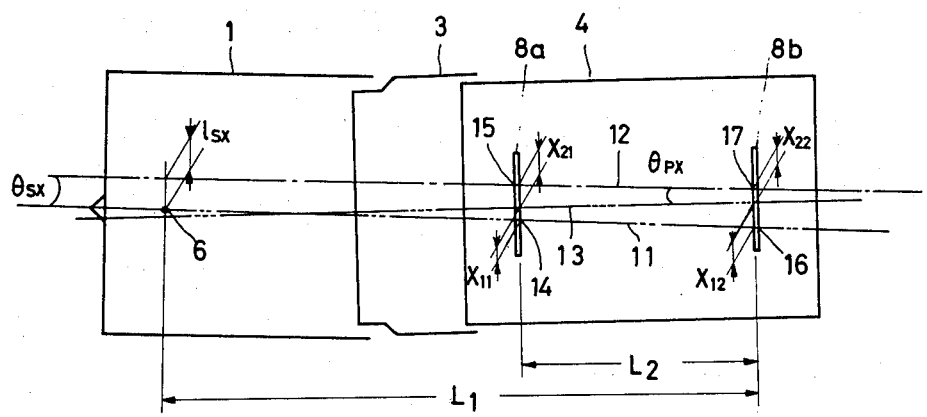
FIG. 4 is a schematical plan view of a possible orientation of the shield machine and succeeding pipes according to the present invention.
Figure 5:
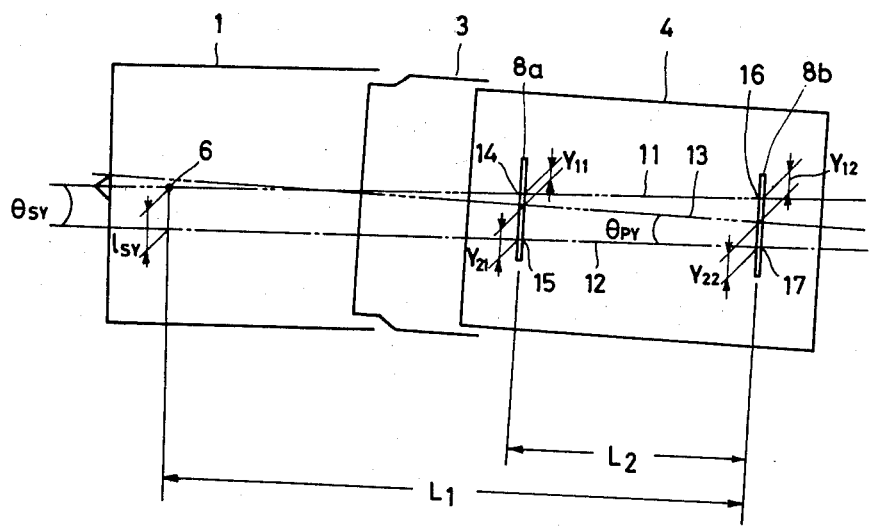
FIG. 5 is a schematical side view of FIG. 4.

When the shield machine 1, the short tube 3 and the succeeding pipe 4 are oriented as shown in FIG. 4 in a plan view and in FIG. 5 in a side view, the central longitudinal axis 11 of the shield machine 1 (i.e. the light beam emitted from the first light emitter 5), the predetermined scheduled central axis 12 of the tunnel to be constructed (i.e. the light beam emitted from the second light emitter 9), and the central longitudinal axis 13 of said succeeding pipe 4 in which the targets 8a and 8b are provided, are oriented as shown in FIGS. 4 and 5.

Figure 6A:
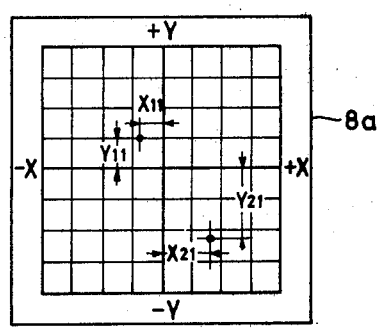
FIGS. 6A and 6B are front views of targets used in the present invention.
Figure 6B:
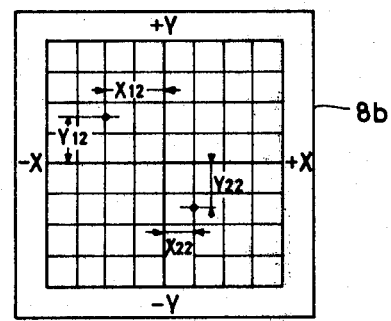

In this state, the target 8a is pivoted downwardly by the support and drive means 7a into operative position while the other target 8b is held in the upwardly pivoted inoperative position by the support and drive means 7b so as not to intercept the light beam from the second light emitter 9. Thus, a light spot 14 is formed on the target 8a by the light beam 11 emitted from the first light emitter 5 and another light spot 15 is formed by the light beam 12 emitted from the second light emitter 9. FIG. 6A shows such light spots 14 and 15 on the target 8a as viewed from the T.V. camera 10. The coordinates $(X_{11}, Y_{11})$ and $(X_{21}, Y_{21})$ of the light spots 14 and 15, respectively, are read by the T.V. camera 10 or directly by an operator without the use of the T.V. camera 10. Thereafter, the target 8a is pivoted upwardly into inoperative position and the target 8b is pivoted downwardly into operative position. The coordinates $(X_{12}, Y_{12})$ and $(X_{22}, Y_{22})$ of light spots 16 and 17 corresponding to the light spots 14 and 15, respectively, are similarly read.

With the data thus collected, the angular and transversal displacements of the shield machine 1 and the succeeding pipe 4 can be determined or calculated in the following way.

(1) The angular displacement $\theta_{px}$ of the succeeding pipe 4 in the X-direction (horizontal direction):

$$\theta_{px} = \tan^{-1}\left(\frac{X_{22} - X_{21}}{L_2}\right)$$

(2) The transversal displacement $l_{px}$ of the succeeding pipe 4 in the X-direction at the target 8b:

$$l_{px} = -X_{22} \cdot \cos\theta_{px}$$

Since $\cos\theta_{px}$ is substantially equal to 1, $$l_{px} \approx -X_{22}.$$

(3) The angular displacement $\theta_{sx}$ of the shield machine 1 in the X-direction:

$$\theta_{sx} = \tan^{-1}\left(\frac{(X_{11} - X_{21}) - (X_{12} - X_{22})}{L_2}\right)$$

(4) The transversal displacement $l_{sx}$ of the shield machine 1 in the X-direction at the reference point 6:

$$l_{sx} = \left[ \frac{L_1}{L_2} \{(X_{11} - X_{21}) - (X_{12} - X_{22})\} + (X_{12} - X_{22}) \right].$$

$$\cos \theta_{px} \approx \frac{L_1}{L_2} \{(X_{11} - X_{21}) - (X_{12} - X_{22})\} + (X_{12} - X_{22})$$

(5) The angular displacement $\theta_{py}$ of the succeeding pipe 4 in the Y-direction (vertical direction):

$$\theta_{py} = \tan^{-1}\left(\frac{Y_{22} - Y_{21}}{L_2}\right)$$

(6) The transversal displacement $l_{py}$ of the succeeding pipe 4 in the Y-direction at the target 8b:

$$l_{py} = -Y_{22} \cdot \cos \theta_{py}$$

Since $\cos \theta_{py}$ is substantially equal to 1, $$l_{py} \approx -Y_{22}.$$

(7) The angular displacement $\theta_{sy}$ of the shield machine 1 in the Y-direction:

$$\theta_{sy} = \tan^{-1}\left\{\frac{(Y_{11} - Y_{21}) - (Y_{12} - Y_{22})}{L_2}\right\}$$

(8) The transversal displacement $l_{sy}$ of the shield machine 1 in the Y-direction at the reference point 6:

$$l_{sy} = \left[\frac{L_1}{L_2}\{(Y_{11} - Y_{21}) - (Y_{12} - Y_{22})\} + (Y_{12} - Y_{22})\right].$$

$$\cos \theta_{py} \approx \frac{L_1}{L_2}\{(Y_{11} - Y_{21}) - (Y_{12} - Y_{22})\} + (Y_{12} - Y_{22})$$

In the above, $L_1$ is a distance between the target 8b and the reference point 6, and $L_2$ is a distance between the targets 8a and 8b. The distance $L_1$ can be deemed as being constant since the relative angular displacement between the shield machine 1 and the succeeding pipe 4 does not noticeably change the distance $L_1$. The reference point 6 may be taken at a point on the opposite side of the target 8b at the distance $L_1$ from the target 8b.

With such determined angular and transversal displacements of the shield machine 1 and the succeeding pipe 4 relative to the predetermined scheduled central axis 12 of the tunnel to be constructed, the current orientation of the shield machine 1 and the succeeding pipe 4 can be easily known. Thus, by suitably actuating the jacks 2 the propelling direction of the shield machine 1 can be controlled or corrected so that the shield machine 1 is propelled properly along the scheduled central axis 12 of the tunnel to be constructed.

The calculation of the angular and transversal displacements of the shield machine 1 and the succeeding pipe 4 can be carried out by a computer provided on the ground. Though the pipings for the jacks 2 are not shown in the drawings, it can be easily designed by those skilled in the art. The control of various valve means (also not shown in the drawings) of the pipings can be effected also on the ground.

While the principles of the invention have been described above in connection with specific embodiments, it is to be easily understood that this description is made only by way of example and not as a limitation of the scope of the invention.

For instance, the targets 8a and 8b can be provided in the second succeeding pipe instead of the first succeeding pipe (i.e. the pipe immediately succeeding to the shield machine 1).

What we claim is:

1. A method of determining angular and transversal displacements of a shield machine and a succeeding pipe relative to a predetermined scheduled central axis of a tunnel to be constructed by pipe-jacking tunneling comprising,
    (a) providing on the shield machine a first light emitter which emits rearwardly a light beam along the central longitudinal axis of the shielf machine and a reference position on said axis of the shield machine,
    (b) projecting said light beam to a pair of targets each having a scale and provided in a succeeding pipe and spaced from each other by a pre-determined distance along the central longitudinal axis of said succeeding pipe to form light spots on the targets,
    (c) projecting to said pair of targets a light beam emitted from a second light emitter along said scheduled central axis of the tunnel to be constructed to form further light spots on the targets, said second light emitter being located at the rear portion of the tunnel, and
    (d) reading said light spots and said further light spots on each targets on the respective scales and measuring a distance from said reference position to one of said targets to determine the angular and transversal displacements of the shield machine and said succeeding pipe relative to said scheduled central axis of the tunnel to be constructed.

2. An apparatus for determining angular and transversal displacements of a shield machine and a succeeding pipe relative to a predetermined scheduled central axis of a tunnel to be constructed by pipe-jacking tunneling comprising,
    (a) a first light emitter provided in the shield machine for emitting a light beam rearwardly along the central longitudinal axis of the shield machine,
    (b) a pair of targets arranged in said succeeding pipe for receiving the light beam emitted from said first light emitter to form light spots thereon and each having a scale and spaced from each other by a predetermined distance along the central longitudinal axis of said succeeding pipe, and
    (c) a second light emitter located in the rear portion of the tunnel for emitting a light beam along said scheduled central axis of the tunnel to be constructed to form light spots on the targets,
    (d) said light spots on each target on the respective scales being read to determine angular and transversal displacements of the shield machine and said succeeding pipe relative to said predetermined scheduled central axis of the tunnel to be constructed.

3. An apparatus as claimed in claim 2, wherein each of said targets is pivotally mounted in said succeeding pipe so that the targets are pivotable away from or into the paths of said light beams.

4. An apparatus as claimed in claim 2, wherein each target comprises a semitransparent plate on which the scale is marked.

* * * * *